UNITED STATES PATENT OFFICE.

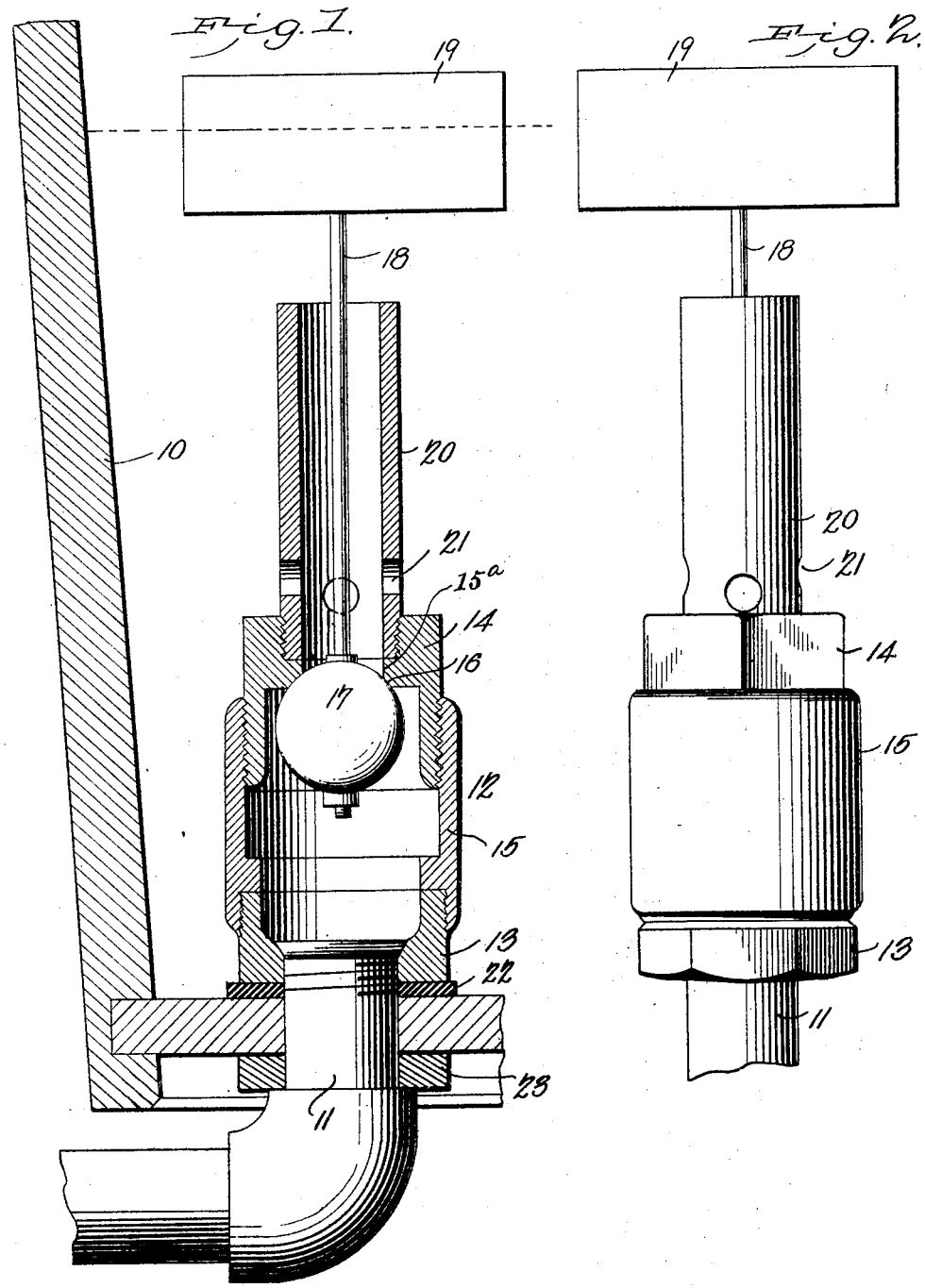

EDWIN P. CLARY, OF DILLEY, TEXAS.

FLOAT-VALVE.

No. 805,003.　　　Specification of Letters Patent.　　　Patented Nov. 21, 1905.

Application filed October 15, 1903. Renewed October 14, 1905. Serial No. 282,809.

*To all whom it may concern:*

Be it known that I, EDWIN P. CLARY, a citizen of the United States, residing at Dilley, in the county of Frio and State of Texas, have invented a new and useful Float-Valve, of which the following is a specification.

My invention relates to float-valves designed especially for use in connection with stock-watering tanks, and has for its objects to produce a comparatively simple inexpensive device of this character which will automatically cut off the supply of water when the tank is filled and one in which the parts of the valve-chamber may be readily disconnected and the valve removed for purposes of cleaning or repairing.

To these ends the invention comprises the novel features of construction and combination of parts more fully hereinafter described.

In the accompanying drawings, Figure 1 is a vertical sectional elevation showing a portion of a tank having a valve constructed in accordance with my invention applied thereto. Fig. 2 is a detail side elevation of the valve.

Referring to the drawings, 10 designates a stock-watering tank of the usual or any appropriate construction and material and having leading thereinto through its bottom a supply-pipe 11, which discharges into a valve-chamber 12, comprising a pair of end members or heads 13 14 and a tubular body portion or shell 15.

The end members 13 14, which are of polygonal form in cross-section to adapt them for manipulation by a wrench, are tapped, respectively, into the ends of the shell 15, the lower member 13 being threaded onto the upper end of the pipe 11 for coupling the latter with the tank, while the upper member 14 has an interior annular flange or collar 15ª, upon which is formed a valve-seat 16, against which a ball-valve, of rubber or other suitable material, normally rests for cutting off the supply of water through the casing 12 to the tank. This valve is carried at the lower end of a vertically-movable stem 18, provided at its upper end with a float 19, which when raised by the water in the tank maintains the valve in closed position.

The valve-stem is housed within a vertical stand-pipe 20, tapped at its lower end into the upper end member 14, the flange 15ª of which forms a stop for said stand-pipe and provided adjacent to said end member with a plurality of transverse openings 21, constituting passages for the water from the casing to the tank when the valve is opened. It is to be noted that this stand-pipe is of such length relative to the stem 18 that it will serve as a stop to limit the downward movement of the float under the influence of an ebb of water in the tank to thus prevent the valve seating upon and closing the upper end of the pipe 11, it being apparent that when the water rises to its normal level the float will rise with it, thus actuating the valve to automatically cut off the supply of water; also, that when the valve thus rises and strikes the valve-seat the latter will be greatly reinforced and possibility of breakage prevented by the lower end of the stand-pipe abutting upon the valve-seat.

Disposed between the lower member 13 and the adjacent inner face of the tank-wall is a packing gasket or washer 22, while a member or washer 23 is likewise disposed between the outer face of the wall and the adjacent end of a coupling-elbow 24, provided in the pipe 11. It is apparent that under this arrangement when the member 13 is properly operated for drawing the pipe 11 upward the washers 22 23 will be clamped tightly against the adjacent faces of the wall, thus insuring a secure water-tight joint and, furthermore, rendering the connection of the pipe with the tank firm and secure.

It is obvious that from the foregoing I produce a simple efficient device admirably adapted for the attainment of the ends in view and one in which the various parts of the valve-casing may be readily disconnected for purposes of cleaning or to permit removal of the valve for repair, and this without disturbing the connection between the tank and its supply-pipe. The position of the stand-pipe is regulated by the flange or collar 15ª, which also constitutes a valve-seat. It is to be noted, however, that should the contingency at any time arise the pipe may be readily disconnected from the tank merely by unscrewing the member or nut 13. In attaining these ends it is to be understood that minor changes in the details of construction herein set forth may be resorted to without departing from the spirit of the invention.

Having thus described the invention, what is claimed is—

The combination with a stock-watering tank, of means for regulating the admission of water into said tank, said means comprising a cylindrical casing, a lower end member threaded into said casing, an inlet-pipe extended through the bottom of the pipe and threaded into the lower end member, an upper end member threaded into the casing and having an interior annular flange forming a valve-seat, a stand-pipe threaded into the upper end member and having apertures in the sides thereof, a valve-stem extending through said stand-pipe, a valve upon said stem seating upon the under side of the annular flange in the upper end member, and a float at the upper end of the valve-stem; said stand-pipe abutting upon and reinforcing the annular flange forming the valve-seat in the upper end member and said stand-pipe being also adapted to support the float when the latter is in a lowered position.

In testimony that I claim the foregoing as my own I have hereto affixed my signature in the presence of two witnesses.

EDWIN P. CLARY.

Witnesses:
C. R. MILLER,
C. L. LOWRY.